July 11, 1939.  N. T. BALDANZA  2,165,209
CABLE CUTTER
Filed April 20, 1937   2 Sheets-Sheet 2
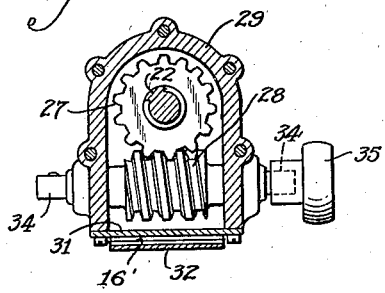
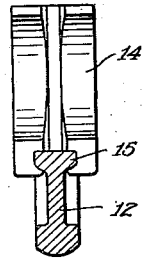
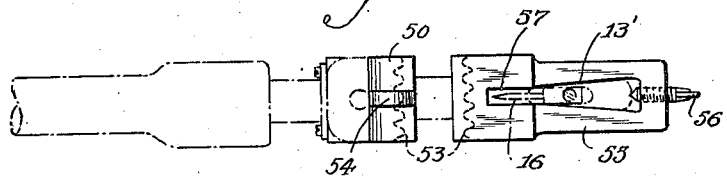
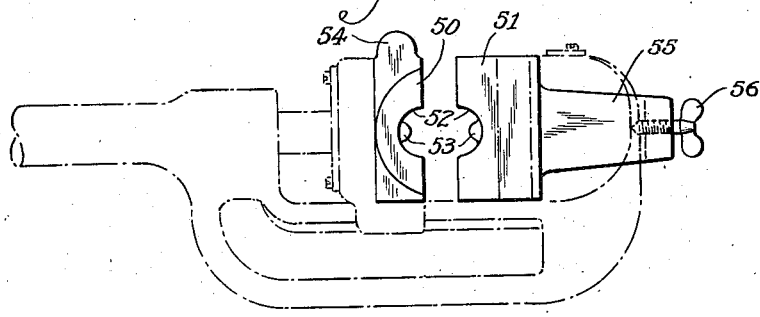
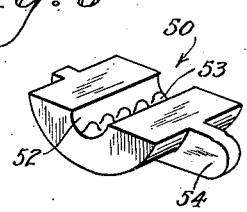
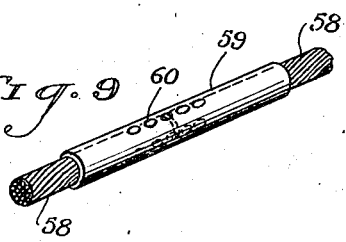
Nicholas T. Baldanza
INVENTOR Patented July 11, 1939

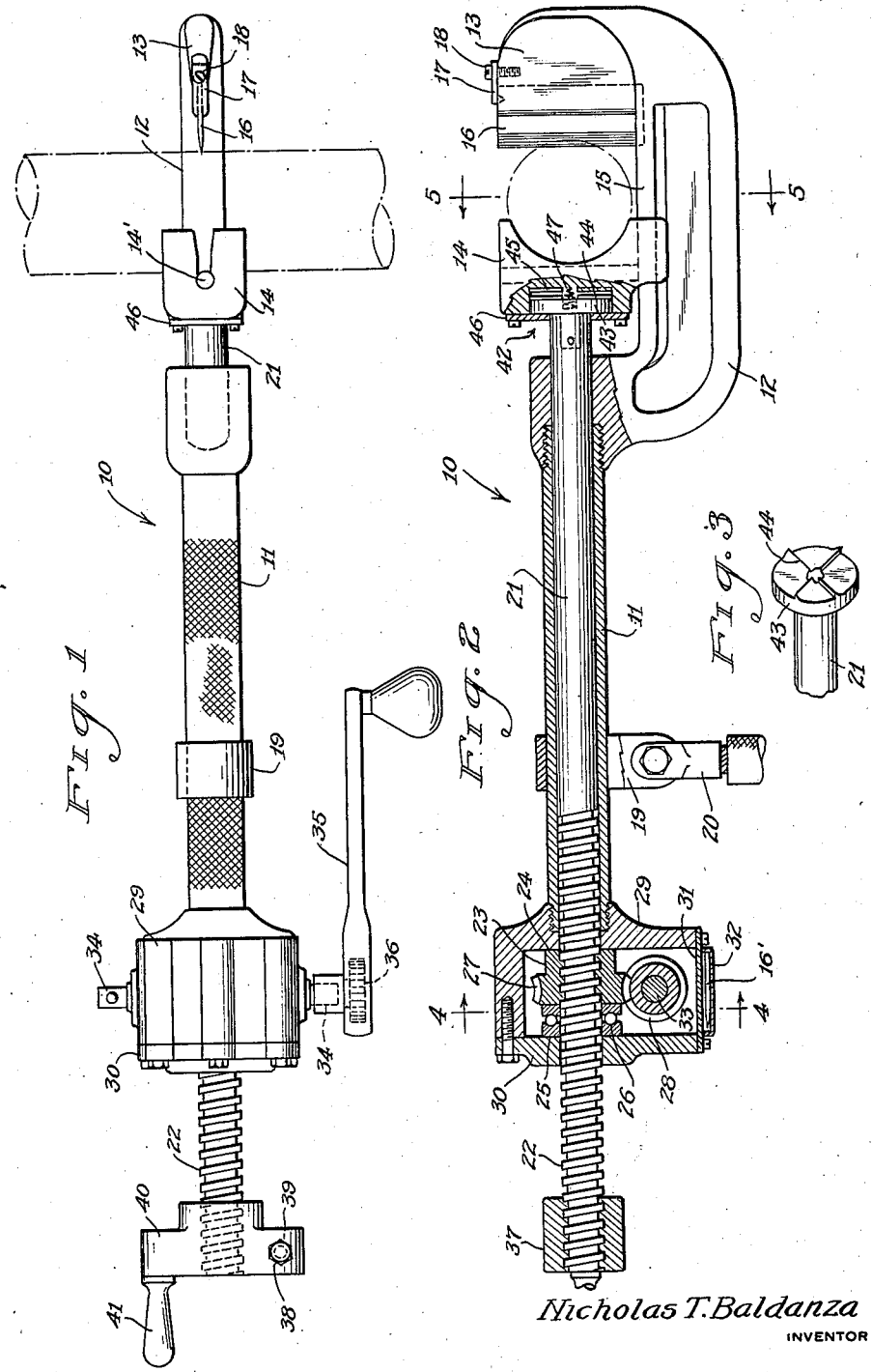

2,165,209

UNITED STATES PATENT OFFICE 2,165,209

CABLE CUTTER

Nicholas T. Baldanza, Passaic, N. J.

Application April 20, 1937, Serial No. 137,991

5 Claims. (Cl. 30—182)

(Granted under the act of March 3, 1883, as amended April 30, 1928; 370 O. G. 757)

The invention relates to cutting devices for cables, rods and the like, and has for one of its objects the provision of an improved cable cutting device especially adapted for use in severing cables or electric conduits that may be transmitting electric current at the time.

A further object of this invention is to provide a cable cutter capable of operating on cables of appreciable diameter, the cutting tool including actuating means by which to assure ample pressure on the cutting elements of the tool, the actuating means being so arranged as to facilitate operation of the tool in confined quarters otherwise awkward to work in.

A further object of the invention resides in the provision of a cutting device of the character indicated having dual operating means for the actuation of the cutting elements, the mentioned means including means for preliminarily advancing one of the cutting elements into initial cutting position and also including a second actuating means for urging the cutting elements onto a cable under appreciable pressure so as to sever the cable in a rapid and efficient manner.

Another object is to provide a crimping or deforming tool adapted for attachment to and cooperation with the cable cutting tool so as to convert same for use in making cable splices employing couplings or sleeves to effect the cable joint, the entire tool, in the modified form, presenting effective means for securing the mentioned sleeve to the cable ends being joined.

Other objects and advantages of the invention will be apparent by reference to the detailed description thereof when read in connection with the accompanying drawings which form part of this application.

In the drawings:

Fig. 1 is a top elevational view of the cable cutter in position for operation in cutting a cable.

Fig. 2 is a side elevational view of the cable cutter as shown in Fig. 1, partly broken away in central section to illustrate the actuating means for the cutting elements thereof.

Fig. 3 is a fragmentary perspective view of a portion of the actuating means embodying a member of a unidirectional clutch thereof.

Fig. 4 is a transverse sectional view taken on line 4—4 of Fig. 2.

Fig. 5 is a transverse sectional view taken on line 5—5 of Fig. 2.

Fig. 6 is a fragmentary top elevational view of a modified form of the tool embodying means for crimping a cable coupling, the body of the tool being shown in phantom.

Fig. 7 is a fragmentary side elevational view of the form of the tool illustrated in Fig. 6, the body of the tool being shown in phantom.

Fig. 8 is a perspective view of one element of the coupling deforming tool; and

Fig. 9 is a perspective view of a typical cable joint employing a coupling, the same illustrating the work accomplished by the device in its modified form.

Reference is now directed to the accompanying drawings for a more detailed description thereof in which the numeral 10 indicates generally the body of the cable cutter, the same including a handle 11, at one end of which is affixed a frame 12 provided for the support of the cutting or deforming elements of the device. The frame 12 is preferably of C-form, on which is provided a fixed jaw 13 and a movable jaw 14, the latter being slidably carried on suitable guideways 15 forming part of the frame 12.

The fixed jaw 13 and the movable jaw 14 constitute the preferred form of cable cutting means and accordingly one of the jaws, preferably the fixed jaw 13, is provided with a suitable blade 16 attached thereto. The blade 16 is preferably mounted by being inserted in a groove formed in the jaw 13 and is retained therein by a hooked plate 17 having a projection thereon for engagement in a recess of the blade 16, the plate 17 being held in position as by a screw 18.

The jaws 13 and 14 are preferably constructed of a metallic material but, in order to prevent any risk of injury to an operator in cutting a live cable transmitting electric current, it may be desirable to construct the jaws 13 and 14 so as to insulate these cutting elements from the body 10 of the tool. In this instance the knife blade 16 may be seated in a bushing or lining disposed within the groove formed in the jaw 13 for holding the blade 16, and the plate 17 may be formed of insulating material. It will also be apparent that the jaw 14 may be fabricated entirely or in part of insulating material, thus preventing any transmission of electric current into the body of the tool. As a further safety measure, the body 10 is provided with a suitable terminal or clamp 19 adapted to have connected thereto a ground cable 20 so that any current entering the body of the tool will be shunted into the ground.

The actuating means for the movable jaw 14 includes a plunger 21 mounted for axial movement in the body 10 and preferably journalled in the handle 11. The plunger 21 is pivotally connected to the jaw 14 primarily so as to impart movement thereto in either direction as will be described in more detail hereinafter.

The plunger 21 is provided, at the end opposite the jaw 14, with a thread 22 on which is threadedly engaged a rotatable collar 23, the latter abutting shoulders 24 and 25 on the body 10, a suitable anti-friction thrust bearing 26 being employed at one side of the collar 24. The collar 24, being threadedly carried on the plunger 21, comprises means for axially actuating the plunger 21 in moving the jaw 14, the same being accomplished by rotation of the collar 24.

Suitable leverage means is employed for rotating the collar 24 with appreciable power so that the jaw 14 has imparted thereto a pressure adequate to cut a cable with comparative ease, the leverage means being operated manually. The means for rotating the collar 24 may embody any desirable reduction gearing, preferably that illustrated, in which the collar 24 includes a worm gear or spiral gear 27 representing the driven gear of the lever means. In mesh with the driven gear is a driving gear 28 presenting either a worm or spiral gear.

The reduction gearing, including the gears 27 and 28, is encased within a housing 29 to serve as a retainer for lubricant about the gears, the housing 29 forming part of the body 10 and being affixed to the end of the handle 11 thereof. The housing 29 includes a wall 30 presenting the shoulder 25, the wall 30 embodying a detachable member of the housing 29 to facilitate installation of the gearing therein. The housing 29 also includes a detachable cover 31 on which is provided a pocket 32 to receive therein an extra knife blade 16'.

The driving gear 28 is carried on a shaft 33 journalled in the housing 29 and projecting thru at least one side thereof, the projecting end or ends of the shaft 33 being formed to provide a key 34 for engagement of a suitable crank arm 35 by which the gears are manually operated. To facilitate operation of the tool in close quarters the crank arm 35 includes a pawl and ratchet mechanism 36 to permit same to be operated in a minimum arc by reciprocating movement.

As aforeindicated, the tool embodies dual means for actuating the movable jaw 14, means being provided to rotate the plunger 21 independent of the previously described leverage means. Accordingly, a clamp nut 37 is affixed to the free end of the plunger 21, being preferably threadedly engaged therewith and retained thereon in normally fixed position as by a clamp screw 38 passing thru a bifurcated portion 39 of the nut 37. The nut 37 is extended radially to form a crank arm 40 on which is affixed a crank handle 41. By this means the plunger 21 may be rotated in the threaded collar 24 to advance as a screw to initially move the jaw 14 into engagement with the work preparatory to cutting a cable. The nut 37 also serves as an adjustment collar on the plunger 21 to limit the extreme position of the jaw 14 relative to the blade 16. In this manner the final position of the jaw 14 may be predetermined so as to prevent injury of the blade 16 by engagement of the jaw 14 therewith. To further prevent such damage to the blade 16, an insert 14' of relatively soft material is installed in the jaw 14 at the region against which the blade 16 may engage.

In the operation of the tool to cut a cable, the jaw 14 being actuated thru the leverage including the crank arm 35, a tendency of the plunger 21 to rotate backward may result due to the reverse thrust thereon imparted to the threaded portion 22. To prevent this a uni-directional clutch 42 is employed for connection between the plunger 21 and the jaw 14. A disc 43 is affixed to the plunger 21 and has its end surface formed to provide a series of ratchet teeth 44 as shown in Fig. 3, and the corresponding surface of the jaw 14 is similarly provided with ratchet teeth 45. The disc 44 is maintained in association with the jaw 14 as by a thrust plate 46 secured thereto. The respective members of the uni-directional clutch 42 are held normally out of engagement with each other by a resilient member such as a compression spring 47 forming a pivot bearing between the plunger 21 and the jaw 14, the power of spring 47 being adequate to freely move the jaw 14 as will be had during initial advancement of same. As the jaw 14 engages the work the spring 47 is compressed so that the teeth 44 of disc 43 engage the teeth 45 in the jaw 14, thereby preventing further rotation of the plunger 21 and same is now ready for efficient operation of the tool under appreciable leverage by the crank arm 35.

Attention is now directed to Figs. 6 to 9, inclusive, for a description of the modified form of the tool embodying means for securing cable couplings as by clamping or deforming, as illustrated in Fig. 9. In this instance the jaws 13 and 14 are formed to provide crimping dies 50 and 51 to accomplish the work. These dies may be integrally formed on the respective jaws 13 and 14 but are preferably formed so as to be detachable therefrom, thus rendering the tool readily serviceable for either cutting or joining cables. The work surfaces of the respective dies 50 and 51 each define grooves 52 into which the cable coupling is disposed. The dies also include suitable deforming elements disposed in the grooves 52 preferably presenting a series of projections or nodes 53. The die 50 is adapted to be attached to the movable jaw 14, the same being formed in counterpart thereto so as to be nested within same. To facilitate installation and removal of the die 50 same is provided with a grip 54 extending therefrom.

The die 51 is affixed to the jaw 13 by means of a clamp 55 straddling the jaw 13 and including a clamp screw 56 for engagement therewith. The die 51, being disposed over the knife blade 16, has a recess 57 therein to receive the knife. The interior surfaces of the clamp 55 are tapered to fit the convergent sides 13' of the fixed jaw 13 so as to securely fix the die 51 in cooperation with the clamp screw 56.

The work accomplished by the dies 50 and 51 is illustrated in Fig. 9, in which the respective ends of cables 58 to be coupled are aligned to receive thereon a coupling sleeve 59. The coupling 59 is secured to the cable ends by being crimped, indented, or otherwise deformed, this work being accomplished by moving the dies 50 and 51 in clamping position over the coupling 59 so that the projections 53 impress a series of indents 60 both into the coupling 59 and the cables 58, thus securing these members together.

Other modifications and changes in the proportions and arrangements of the parts may be made by those skilled in the art without departing from the nature and scope of the invention, as defined in the appended claims.

The invention described herein may be manufactured and used by or for the Government of the United States of America for governmental purposes without the payment of any royalties thereon or therefor.

Having thus set forth and disclosed the nature of this invention, what is claimed is:

1. A cable tool comprising a body, a fixed jaw and a movable jaw on said body, means for actuating the movable jaw relative to the fixed jaw including a plunger screw engaging the movable jaw to actuate same to and from said fixed jaw, a rotatable collar threadedly carried on said plunger screw and retained against axial movement by said body, and a uni-directional clutch interposed between the plunger screw and a non-rotating member of the tool to prevent rotation of the plunger screw in one direction only.

2. A cable tool comprising a body, a fixed jaw and a movable jaw on said body, means for actuating the movable jaw relative to the fixed jaw including a plunger screw engaging the movable jaw to actuate same to and from said fixed jaw, a rotatable collar threadedly carried on said plunger screw and retained against axial movement by said body, and a uni-directional clutch interposed between the plunger screw and said movable jaw and comprising complementally formed surfaces on the respective movable jaw and plunger screw adapted upon engagement to prevent relative rotation thereof.

3. A cable tool comprising a body, a fixed jaw and a movable jaw on said body, means for actuating the movable jaw relative to the fixed jaw including a plunger screw engaging the movable jaw to actuate same to and from said fixed jaw, a rotatable collar threadedly carried on said plunger screw and retained against axial movement by said body, a uni-directional clutch interposed between the plunger screw and said movable jaw and comprising complementally formed surfaces on the respective movable jaw and plunger screw adapted upon engagement to prevent relative rotation thereof, and resilient means for normally holding said surfaces disengaged.

4. A cable tool comprising a body, a first jaw on said body and having a blade carried thereby, and a second jaw slidable on said body and having a cable seat and a blade receiving recess therein, means for actuating the movable jaw relative to said blade so as to press said blade into the cable therebetween, and means for safeguarding the operator in cutting a live electric cable, said protective means including the use of insulating material adjacent to said body, and a grounding clamp attached to the housing of said tool.

5. A cable tool comprising a body, a first jaw on said body and having a replaceable deforming die carried thereby, and a second jaw slidable on said body and having a replaceable deforming die carried thereby, said dies having a transverse groove for admission of a cable coupling member therein including projections for indenting the cable coupling, means for actuating the slidable jaw relative to said first jaw including a plunger engaging the movable jaw to actuate same to and from said first jaw, a feed screw formed on the other end of said plunger, a wormwheel threadedly carried on said feed screw, a housing extending from said body, thrust bearings for said wormwheel within said housing, a worm for rotating said wormwheel, and dual means for urging said plunger longitudinally, said dual means including a plunger crank arm for rotating said plunger feed screw in the threaded wormwheel for quickly advancing the slidable jaw into preliminary deforming position, and means for rotating said wormwheel for urging the slidable jaw against the cable coupling under appreciable pressure.

NICHOLAS T. BALDANZA.